United States Patent [19]

Nakamura et al.

[11] 4,337,276

[45] Jun. 29, 1982

[54] METHOD FOR STORING PRODUCE AND CONTAINER AND FRESHNESS KEEPING AGENT THEREFORE

[75] Inventors: Hachiro Nakamura, Ichikawa; Norio Nakazawa, Kawaguchi, both of Japan

[73] Assignee: Toppan Printing Company, Limited, Japan

[21] Appl. No.: 122,693

[22] Filed: Feb. 19, 1980

Related U.S. Application Data

[63] Continuation of Ser. No. 946,409, Sep. 27, 1978, abandoned.

[30] Foreign Application Priority Data

Nov. 21, 1977 [JP] Japan ............................... 52-139636
Dec. 26, 1977 [JP] Japan ............................... 52-157015
Jan. 19, 1978 [JP] Japan ................................... 53-4733

[51] Int. Cl.³ .................. B65D 81/24; B65D 85/50
[52] U.S. Cl. ............................... 426/124; 55/387; 55/389; 422/4; 422/40; 426/118; 426/398; 426/419
[58] Field of Search ............... 426/419, 124, 331, 324, 426/398, 118; 55/31, 33, 387, 389; 422/4, 40; 252/455 R, 455 Z, 446

[56] References Cited

U.S. PATENT DOCUMENTS

| | | | |
|---|---|---|---|
| 1,315,163 | 9/1919 | Schwartz | 55/387 |
| 3,313,630 | 4/1967 | Harvey | 426/419 |
| 3,313,631 | 4/1967 | Jensen | 426/419 |
| 3,450,544 | 6/1969 | Badran et al. | 426/415 |
| 3,761,289 | 9/1973 | Wolf | 426/118 |
| 3,795,749 | 3/1974 | Cummin et al. | 426/316 |
| 3,946,118 | 3/1976 | Sakai | 426/419 |
| 3,958,028 | 5/1976 | Burg | 426/419 |
| 3,981,698 | 9/1976 | Leppard | 55/33 |
| 3,990,872 | 11/1976 | Cullen | 426/415 |
| 4,049,834 | 9/1977 | Barwald et al. | 426/419 |
| 4,079,152 | 3/1978 | Bedrosian et al. | 426/124 |
| 4,093,703 | 6/1978 | Buechner et al. | 423/245 |
| 4,113,652 | 9/1978 | Yoshikawa et al. | 426/124 |

FOREIGN PATENT DOCUMENTS

| | | | |
|---|---|---|---|
| 2334749 | 1/1975 | Fed. Rep. of Germany | 426/419 |
| 49-66433 | 6/1974 | Japan | 426/124 |
| 7410 | of 1912 | United Kingdom | 426/419 |
| 691682 | 5/1953 | United Kingdom | 426/419 |
| 1242412 | 8/1971 | United Kingdom | 426/419 |

OTHER PUBLICATIONS

I&FC Product Research & Development, vol. 4, No. 1, 3/65, pp. 48–50.
Hackh's Chem. Dictionary 4th Ed., Grant McGraw Hill 1969.
Condensed Chem. Dictionary 8th Ed. 1971, Hawlett, Van Nostrand.

*Primary Examiner*—Steven L. Weinstein
*Attorney, Agent, or Firm*—Bacon & Thomas

[57] ABSTRACT

A storage container containing a freshness keeping agents for vegetables and fruits, consisting essentially of a particulate composition which contains at least two components selected from the group consisting of zeolite, bentonate and activated carbon. The freshness keeping agent absorbs ethylene gas, etc. generated from vegetables and fruits, thereby preventing them from overripening, softening, etc.

11 Claims, No Drawings

METHOD FOR STORING PRODUCE AND CONTAINER AND FRESHNESS KEEPING AGENT THEREFORE

This is a continuation, of application Ser. No. 946,409, filed Sept. 27, 1978 now abandoned.

This invention relates to a freshness keeping agent for vegetables and fruits, more particularly, to a composition adsorbing ethylene gas, aldehyde gas, alcohol gas, etc. generated from vegetables and fruits during the storage thereof, therby keeping fresh the vegetables and fruits.

Since vegetables and fruits continue their respiratory actions after the reaping, gradual quality deterioration occurs during the storage thereof, including decay, withering, overripening, softening, etc. Specifically, vegetables and fruits generate ethylene gas, aldehyde gas and alcohol gas in the ripening process. What should be noted is that the presence of these gases further promotes the ripening of the vegetables and fruits. Further, the progress of the ripening process lends to the softening of the vegetables and fruits, resulting in rottenness under the action of microorganisms.

Decay and withering are caused by the water evaporation from the surfaces of vegetables and fruits. Since the water evaporation is related to the respiratory action, the decay and withering of vegetables and fruits can be controlled by suppressing the respiratory action thereof.

As a matter of fact, it is popular to preserve or transport vegetables and fruits under low temperatures so as to suppress the respiratory action thereof and, thus, to keep them fresh for a long period of time. However, the preservation or transportation under low temperatures necessitates large facilities. What is also serious is that the vegetables and fruits kept at low temperatures are rapidly deteriorated if suddenly exposed to an ambient temperature.

Certain kinds of vegetables and fruits are preserved under low temperature and under a predetermined gas concentration. This method, however, is also defective in that large facilities are required and that the preserved vegetables and fruits are rapidly deteriorated when exposed to the ambient atmosphere.

It is also known to the art to preserve certain kinds of vegetables such as a leek and a spanish paprika under nitrogen atmosphere. This method, however, is not satisfactory in preservation capability of the vegetables, necessitates costly equipment and leaves room for improvement in working efficiency.

Recently, a deoxidation agent such as a mixture of sodium hydrosulfite and calcium hydroxide or a mixture of glucose and glucose oxidase attracted attention as a preservative of processed foodstuff. The deoxidation agent is housed together with processed foodstuff in a hermetically sealed container, with somewhat satisfactory result. However, it is substantially impossible to preserve vegetables and fruits under a hermetically sealed condition, resulting in marked reduction of the deoxidation power of the deoxidation agent housed together. In addition, that portion of the vegetable or fruit which is in direct contact with the deoxidation agent is seriously deteriorated.

It is also known to spray o-phenylphenol diphenyl, maleic hydrazide, 2,4-dichlorophenoxy acetic acid, etc. directly onto vegetables or fruits for preservation of the vegetables or fruits. Certainly, these chemicals serve to prevent the vegetable or fruit from bearing mold and from rotting, but are not desirable from sanitary point of view.

Finally, Japanese Patent Disclosure No. 66433/74 laid open for public inspection on June 27, 1974 teaches the idea of loading activated carbon in the package for absorption of the ethylene gas, etc. generated from the packed fruit. However, the use of activated carbon alone fails to absorb the ethylene gas, etc. effectively and sufficiently, resulting in failure to prevent the undue progress of ripening, color change, etc. of the fruit under preservation.

An object of this invention is to provide a freshness keeping agent for vegetables and fruits, low in cost, easy to use and free from any sanitary problem.

The freshness keeping agent according to this invention consists essentially of a particulate composition containing at least two kinds of adsorbents selected from the group consisting of zeolite, bentonite and activated carbon and effectively adsorbs ethylene gas, aldehyde gas, alcohol gas, etc. generated from vegetables and fruits under preservation.

According to a preferred embodiment of this invention, the freshness keeping agent may further contain a salt of, for example, iron (II), ascorbic acid or a salt thereof, and an alkaline compound depending on the kind of the preserved vegetable or fruit and on the purpose of the preservation so as to absorb the carbon dioxide and oxygen present in the package of the vegetable or fruit or to generate carbon dioxide gas in the package.

Further, the freshness keeping agent may also contain at least one of activated alumina and activated clay as an auxiliary adsorbent.

The freshness keeping agent of this invention contains as main adsorbents at least two of zeolite, bentonite and activated carbon. The amount of any of the main adsorbents contained in the freshness keeping agent preferably falls within the range of from 5 to 95% by weight, more preferably, from 20 to 80% weight, based on the total amount of the main adsorbents contained in the freshness keeping agent. Zeolite available in the nature may be used in this invention, but it is preferred to use synthetic zeolite having pores sized at 4 to 5 Å, for example, "Molecular Sieve 5A" produced by Union Carbide Inc., U.S.A. Exemplified below are preferred compositions of the main adsorbents:

| Composition | Mixing Ratio (wt %) |
|---|---|
| Synthetic zeolite: Coconut shell activated carbon | 60:40 |
| Synthetic zeolite: Coconut shell activated carbon: bentonate | 50:20:30: |

In addition to the main adsorbents described above, the freshness keeping agent of this invention may further contain at least one auxiliary adsorbent selected from the group consisting of activated alumina and activated clay. In this case, the auxiliary adsorbent is used in an amount ranging from 3 to 50% by weight, preferably, from 20 to 50% by weight, relative to 97 to 50% by weight, preferably, 80 to 50% by weight, of the main adsorbents. Further, the amount of each main adsorbent preferably is at least 2% by weight of the total amount of the main adsorbents for the case of using the auxiliary adsorbent.

Zeolite exhibits a large adsorption capacity with respect to substances of relatively small molecular weight such as ethylene gas. Activated carbon is excellent in its adsorption capacity of substances having relatively large molecular weight. On the other hand, betonite is capable of adsorbing water and carbon dioxide gas besides the gases such as ethylene gas generated from vegetables and fruits in their ripening process.

Exemplified below are preferred compositions of the freshness keeping agent containing the auxiliary adsorbent:

| Composition | Mixing Ratio (wt %) |
|---|---|
| Zeolite: Activated Carbon: Activated Clay | 95~50:2~25:3~25 |
| Zeolite: Activated Carbon: Activated Alumina | 95~50:2~25:3~25 |
| Zeolite: Bentonite: Activated Clay | 95~50:2~25:3~25 |
| Zeolite: Bentonite: Activated Alumina | 95~50:2~25:3~25 |

Each of the above examples covers the case where zeolite is used in the largest amount. However, another main adsorbent may be used in the largest amount instead of zeolite, quite naturally. Incidentally, a mixture of synthetic zeolite (50% by weight), activated carbon prepared from coconut shell (20% by weight) and activated alumina (30% by weight) provides a more preferred example of the freshness keeping agent of this invention.

The freshness keeping agent of this invention described above effectively adsorbs ethylene gas, aldehyde gas, alcohol gas, carbon dioxide gas etc. generated from vegetables and fruits.

The freshness keeping agent of this invention may further contain components other than adsorbents depending on the kind of the preserved vegetable and fruit or on the purpose of preservation. Where it is intended to enhance the absorption efficiency of carbon dioxide gas generated from the vegetable of fruit, hydroxide of alkali metal or of alkaline earth metal such as calcium hydroxide may be mixed into the composition consisting of adsorbents. Calcium hydroxide absorbs carbon dioxide gas as shown below.

$$Ca(OH)_2 + CO_2 \rightarrow CaCO_3 + H_2O$$

Where it is desired to remove the oxygen gas present in the package in order to suppress the respiratory action of the preserved vegetable and fruit, it is effective to use a sulfate or chloride of manganese (II), iron (II) cobalt (II) or nickel (II) as well as ascorbic acid or a salt thereof, together with an alkaline compound. Suitable sulfates used in this invention include manganese (II) sulfate, iron (II) sulfate, cobalt (II) sulfate and nickel (II) sulfate, with suitable chlorides including manganese (II) chloride, iron (II) chloride, cobalt (II) chloride and nickel (II) chloride. Among these compounds, particularly preferred is iron (II) sulfate heptahydrate. Ascorbic acid or a salt thereof used in this invention includes L-ascorbic acid, D-iso-ascorbic acid and sodium salts thereof, with L-ascorbic acid or sodium L-ascorbic acid providing a preferred compound. These sulfates, chlorides and ascorbic acid or a salt thereof may be used single or in combination with each other. The alkaline compounds used together with the above-noted sulfates, etc. include hydroxides such as sodium hydroxide, potassium hydroxide, magnesium hydroxide, calcium hydroxide, zinc hydroxide, and aluminum hydroxide, carbonates such as sodium carbonate and bicarbonates such as sodium bicarbonate.

The freshness keeping agent containing, for example, $FeSO_4$ and $Ca(OH)_2$ absorbs oxygen as shown below:

$$2FeSO_4 + 2Ca(OH)_2 + H_2O + \tfrac{1}{2}O_2 \rightarrow 2Fe(OH)_3 + 2CaSO_4$$

In general, the water generated from the vegetable or fruit is involved in the reaction shown above.

Where a carbonate or a bicarbonate is substituted for the hydroxide, carbon dioxide gas generation takes place together with the oxygen absorption as shown below:

$$2FeSO_4 + 4NaHCO_3 + H_2O + \tfrac{1}{2}O_2 \rightarrow 2Fe(OH)_3 + 2Na_2SO_4 + 4CO_2$$

The carbon dioxide gas generated in this reaction serves to prevent proliferation of microorganisms and, at the same time, is effective for removing the astringency of the astringent fruit such as astringent persimmon.

Ascorbic acid or a salt thereof also absorbs oxygen in the presence of an alkaline compound and water as shown below:

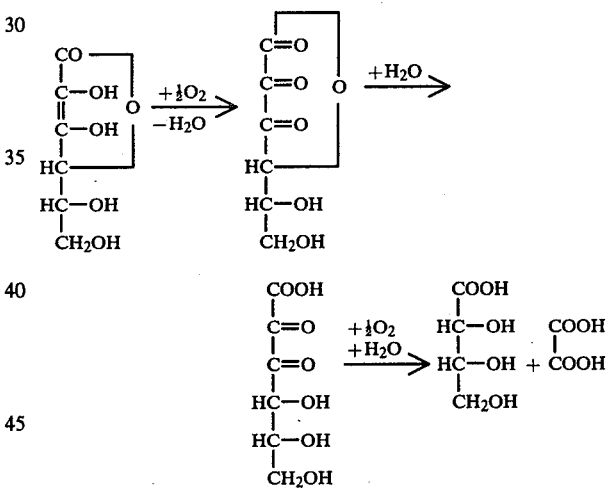

It is not particularly necessary to restrict the mixing ratios of the above noted sulfates, chlorides, ascorbic acid or a salt thereof and alkaline compounds, though it is preferred to use 20 to 100 parts by weight of the alkaline compounds relative to 100 parts by weight of the remaining substances.

The water required for any of the reactions exemplified above is supplied from the vegetable or fruit under preservation. In order to retain and utilize effectively the water supplied from the vegetable or fruit, deliquescent substances such as calcium chloride and magnesium chloride may also be added to the freshness keeping agent of this invention. Further, for the case of preserving vegetables or fruits containing an insufficient amount of water, it is desirable to use hydrated sulfites such as sodium sulfite heptahydrate together with sulfates or chlorides of iron (II), etc. In this case, free water is liberated as shown below and is utilized for any of the reactions exemplified previously:

$$FeSO_4 \cdot 7H_2O + Na_2SO_3 \cdot 7H_2O \rightarrow FeSO_3 + Na_2SO_4 + 14H_2O$$

As described in detail, it is reasonable to state in general that the freshness keeping agent according to this invention comprises 30 to 100% by weight of adsorbents, 0 to 50% by weight of sulfates or chlorides, 0 to 30% by weight of ascorbic acid or a salt thereof, 0 to 30% by weight of alkaline compounds, and 0 to 10% by weight of deliquescent substances or sulfites.

For effective adsorption of the gases generated from vegetables and fruits, the adsorbents used in this invention preferably have specific surface areas. Specifically, it is desirable that zeolite, activated carbon and bentonite have specific surface areas of 600 to 1000 $m^2/g$, 800 to 1500 $m^2/g$ and 100 to 300 $m^2/g$, respectively. On the other hand, desirable specific surface areas of activated alumina and activated clay are 100 to 400 $m^2/g$ and 150 to 300 $m^2/g$, respectively. Concerning the particle sizes of these adsorbents, it is preferred to use granular activated carbon and zeolite sized at 20 to 60 meshes and powderous bentonite, activated alumina and activated clay sized at 100 to 300 meshes.

The freshness keeping agent of this invention is loaded in a permeable bag. For example, it is advisable to loaded about 10 g of the freshness keeping agent in a permeable bag sized at 60 mm×100 mm and made of a laminated sheet consisting of a Japanese paper (40 $g/m^2$ in basis weight), a perforated polyethylene film (15μ in thickness), a special non-woven fabric (19 $g/m^2$ in basis weight), and a perforated polyethylene film (40μ in thickness), followed by sealing the opening of the bag. The special non-woven fabric mentioned is a mesh web obtained by arranging crosswise the stringlike filaments cut from a flat oriented film. The permeable bag housing the freshness keeping agent is put in a container together with the vegetable or fruit to be preversed. Incidentally, the container mentioned is not necessarily made air-tight.

As mentioned previously, the freshness keeping agent put in a container together with vegetables or fruits serves to adsorb effectively the ethylene gas, aldehyde gas, alcohol gas, etc. generated from the vegetables or fruits. Further, oxygen gas is absorbed and carbon dioxide gas generated, if necessary. These functions of the freshness keeping agent render it possible to prevent the decay, withering, overripening, softening etc. of the vegetables and fruits.

Incidentally, the permeable bag housing the freshness keeping agent should be stored in an air-tight container such as a nonpermeable bag for the purpose of preserving the freshness keeping agent itself until it is used.

Table 1 below shows the compositions, indicated by parts by weight, of some samples of the freshness keeping agent consisting of adsorbents alone:

TABLE 1

| Components | 1 | 2 | 3 | 4 | 5 | 6 | 7 | 8 | 9 | 10 | 11 | 12 |
|---|---|---|---|---|---|---|---|---|---|---|---|---|
| Zeolite | 50 | 50 | | | | 50 | 35 | 20 | 30 | 40 | 40 | |
| Bentonite | 50 | | 50 | 60 | 70 | 20 | 30 | 50 | 30 | 40 | | 40 |
| Activated Carbon | | 50 | 50 | 40 | 30 | 30 | 35 | 30 | 30 | | 40 | 40 |
| Activated Clay | | | | | | | | | | 5 | 10 | 10 | 10 |
| Activated Alumina | | | | | | | | | | 5 | 10 | 10 | 10 |

Table 2 shows the compositions, indicated by parts by weight, of some samples of the freshness keeping agent consisting of the adsorbents and the other components.

TABLE 2

| Components | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|
| zeolite | 45 | 45 | | 20 | 20 | | | | | | | | | | | | | 10 | | 10 | |
| bentonite | 45 | | 45 | 20 | | 20 | 30 | 25 | 25 | 25 | 25 | 20 | 20 | 10 | 10 | 25 | 40 | 30 | 25 | 30 | 40 |
| activated carbon | | 45 | 45 | | 20 | 20 | 30 | 25 | 25 | 25 | 25 | 20 | 20 | 20 | 20 | 25 | 20 | 15 | 25 | 15 | 25 |
| activated clay | | | | | | | | | | | | | | 5 | 5 | | | | | | |
| activated alumina | | | | | | | | | | | | | | 5 | 5 | | | | | | |
| $FeSO_4 \cdot 7H_2O$ | | | | 45 | 45 | 45 | 30 | 25 | 25 | 15 | 15 | 15 | 15 | 15 | | 40 | 10 | 15 | 10 | | 20 |
| L-ascorbic acid | | | | | | | | 17 | | 8 | | 15 | | | | | | | 10 | 10 | |
| sodium L-ascorbic acid | | | | | | | | | 17 | | 8 | | 15 | 15 | | | | | | | |
| $Ca(OH)_2$ | 10 | 10 | 10 | 15 | 15 | 15 | 2 | 8 | 8 | 22 | 22 | 4 | 4 | 4 | 4 | | | | | | |
| $Na_2CO_3 \cdot 10H_2O$ | | | | | | | | | | | | 10 | 10 | 10 | | | | | | | |
| $NaHCO_3$ | | | | | | | 8 | | | | | 10 | 10 | 10 | 10 | 8 | 10 | 6 | 10 | 8 | 15 |
| $Na_2SO_3 \cdot 7H_2O$ | | | | | | | | | | | | | | | 4 | | | | | | |
| $CaCl_2 \cdot 2H_2O$ | | | | | | | | 5 | 5 | 5 | 5 | | | | | | | | | | |
| $FeCl_2 \cdot 4H_2O$ | | | | | | | | | | | | 6 | 6 | 6 | | | | | | | |
| KOH | | | | | | | | | | | | | | | | 7 | 15 | 4 | 5 | 2 | |

Described in the following are Examples of this invention. Naturally, this invention is not restricted to these Examples.

EXAMPLE 1

An experiment was conducted for evaluating the effect of preventing tomatos from overripening by using samples 1, 3, 7 and 15 of the freshness keeping agent of this invention shown in Table 1 or 2.

In the first step, 10 g of each sample of the freshness keeping agent was loaded in a permeable bag sized at 60 mm×100 mm and made of a laminated sheet consisting of a Japanese paper (40 $g/m^2$ in basis weight), a perforated polyethylene film (15μ in thickness), a special non-woven fabric (19 $g/m^2$ in basis weight) and a perforated polyethylene film(40μ in thickness), followed by sealing the opening of the permeable bag. Three permeable bags each housing one of the freshness keeping agent and 4 kg of tomatos were put in a corrugated cardboard box having the inner surface of the wall covered with a polyethylene film 60μ thick, followed by folding the edges of the polyethylene film in a manner to wrap the tomatos and the bags of the freshness keeping agent. Finally the opening of the corrugated cardboard box was closed by the lid thereof.

For comparison, two additional tomato-packed boxes were prepared in just the same fashion as above except that three permeable bags each housing 10 g of activated carbon alone prepared from coconut shell were put in one these boxes, with no freshness keeping agent put in the remaining box.

These boxes were put under the atmosphere maintained at about 20° C. for observation of changes with time in color of the tomato, which was green originally, and for observation of occurrences of rotteness and mold growth, with the results as shown in Table 3.

TABLE 3

| Freshness keeping agent | Color change | | | Rotteness or mold growth | | |
|---|---|---|---|---|---|---|
| | 3 days later | 7 days later | 14 days later | 7 days later | 14 days later | 21 days later |
| Sample 1 | green (original color) | green (original color) | green (original color) | none | none | none |
| Sample 3 | green (original color) | green (original color) | green (original color) | " | " | " |
| Sample 7 | green (original color) | green (original color) | green (original color) | " | " | " |
| Sample 15 | green (original color) | green (original color) | green (original color) | " | " | " |
| Activated carbon alone | green (original color) | turned yellow | turned red | " | found | found |
| None | turned yellow | turned red | turned red | found | " | " |

Table 3 shows that the freshness keeping agent according to this invention is advantageous over the conventional freshness keeping agent consisting of activated carbon alone in the effect of keeping fresh tomatos over a long period of time.

An additional experiment was conducted in an attempt to look into the relationship between the sealing condition of the container and the effect produced by the freshness keeping agent of this invention. It was found that the better the sealing condition, the greater the effect produced by the freshness keeping agent of this invention.

EXAMPLE 2

An experiment was conducted for evaluating the effect of keeping fresh "Kyoho", a species of grape, by using samples 1, 2, 3 and 12 of the freshness keeping agent shown in Table 1 as well as the conventional freshness keeping agent of activated carbon prepared from coconut shell (control case).

In the first step, 10 g of each freshness keeping agent was loaded in the same permeable bag as used in Example 1. On the other hand, a foamed polyurethane sheet, 10 mm thick, wrapped by a high quality paper was put at the bottom of a corrugated cardboard box, 120 mm × 160 mm × 90 mm. Then, 1 kg of "Kyoho" and one permeable bag housing the freshness keeping agent were put in the box, followed by placing a polyvinyl chloride film 200μ thick to cover both the grape and the permeable bag. Finally, the opening of the corrugated cardboard box was closed by the lid thereof.

100 boxes were prepared for each case of the freshness keeping agent and put under the atmosphere maintained at about 20° C. in an attempt to look into the change with time in the tendency of the grape to fall from the stem and in the color of the stem, which was green originally. Table 4 shows the results of the experiment. Incidentally, the experiment covered a case where a freshness keeping agent was not used at all as seen from Table 4.

TABLE 4

| Freshness keeping agent | Fall of grape | | | Color of stem | | |
|---|---|---|---|---|---|---|
| | 2 days later | 5 days later | 10 days later | 2 days later | 5 days later | 10 days later |
| Sample 1 | none | none | none | green (original color) | green (original color) | green (original color) |
| Sample 2 | " | " | " | green (original color) | green (original color) | green (original color) |
| Sample 3 | " | " | slight fall | green (original color) | green (original color) | turned yellow |
| Sample 12 | " | " | slight fall | green (original color) | green (original color) | turned yellow |
| Activated carbon alone | " | slight fall | much fall | green (original color) | turned yellow | turned brown |
| None | slight fall | much fall | much fall | turned brown | turned brown | turned brown |

Table 4 shows that the freshness keeping agent of this invention is very effective for keeping grapes fresh for a long period of time.

EXAMPLE 3

An experiment was conducted for evaluating the effects of removing the astringency of astringent persimmons and of preventing the persimmons from softening by using samples 1, 3, 15, 19, 24 and 26 of the freshness keeping agent of this invention shown in Table 1 or 2.

As in Example 1, 10 g of each sample of the freshness keeping agent was loaded in a permeable bag equivalent to that used in Example 1. One permeable bag housing the freshness keeping agent was put in a bag sized at 140 mm × 400 mm and made of a polyethylene film 60μ thick together with 5 astringent persimmons weight about 1 kg in total, followed by closing the opening of the polyethylene bag by using a rubber band. For comparison, carbon dioxide gas was sealed in the polyethylene bag in stead of putting the freshness keeping agent. Further, astringent persimmons alone were put in the polyethylene bag.

The polyethylene bags housing the astringent persimmons were put under the atmosphere maintained at about 25° C. in an attempt to lock into the progresses with time in the astringency removal and softening of the persimmons, obtaining the results as shown in Table 5.

TABLE 5

| Freshness keeping agent | Astringency removal | | | | | Softening degree | | | | | |
|---|---|---|---|---|---|---|---|---|---|---|---|
| | 1 day later | 3 days later | 5 days later | 10 days later | 15 days later | 1 day later | 3 days later | 5 days later | 10 days later | 15 days later | 20 days later |
| Sample 1 | + | + | + | + | − | O | O | O | O | O | Δ |
| Sample 3 | + | + | + | + | − | O | O | O | O | O | Δ |
| Sample 15 | + | + | + | + | − | O | O | O | O | O | Δ |
| Sample 19 | + | + | − | − | − | O | O | O | O | O | O |
| Sample 24 | + | + | − | − | − | O | O | O | O | O | O |
| Sample 26 | + | + | − | − | − | O | O | O | O | O | O |
| $CO_2$ gas | + | + | − | − | − | O | O | O | O | Δ | x |
| None | + | + | + | + | − | O | O | O | Δ | Δ | x |

Note:
+ astringent (Astringency was not removed.)
− non astringent (Astringency was removed.)
O Not softened.
Δ Slightly softened.
x Markedly softened.

Table 5 shows that the freshness keeping agent of this invention is effective for preventing persimmons from softening. It is also seen that samples 19, 24 and 26, which were capable of generating carbon dioxide gas, exhibited the astringency removal effect 5 days later as was the case with the sealing of carbon dioxide gas.

These four cases of packages were transported by air plane from Hokkaido, Japan, the locality of the green asparagus, to Tokyo, Japan, and put under the atmosphere maintained at about 20° C. in order to examine the progress with time of the rottenness at the cut portion and tip of the green asparagus, obtaining the results as shown in Table 6.

TABLE 6

| Type of package | Freshness keeping agent | Rotteness at cut portion (%) | | | | Rotteness at the tip (%) | | |
|---|---|---|---|---|---|---|---|---|
| | | 0* | 24 hours later | 48 hours later | 72 hours later | 24 hours later | 48 hours later | 72 hours later |
| Case (a) | Sample 1 | 0 | 0 | 0 | 0 | 0 | 0 | 0 |
| " | Sample 9 | 0 | 0 | 0 | 1 | 0 | 0 | 0 |
| " | Sample 15 | 0 | 0 | 0 | 0 | 0 | 0 | 0 |
| " | Sample 18 | 0 | 0 | 0 | 1 | 0 | 0 | 0 |
| Case (b) | Sample 1 | 0 | 0 | 0 | 5 | 0 | 0 | 2 |
| " | Sample 9 | 0 | 0 | 0 | 9 | 0 | 0 | 7 |
| " | Sample 15 | 0 | 0 | 0 | 8 | 0 | 0 | 5 |
| " | Sample 18 | 0 | 0 | 0 | 10 | 0 | 0 | 7 |
| Case (c) | None | 0 | 2 | 12 | 50 | 0 | 4 | 27 |
| Case (d) | None | 0 | 1 | 15 | 57 | 0 | 6 | 46 |

*Immediately after arrival at Tokyo

EXAMPLE 4

An experiment was conducted for evaluating the effect of keeping green asparagus fresh by using samples 1, 9, 15 and 18 of the freshness keeping agent of this invention shown in Table 1 or 2.

As in Example 1, 10 g of each sample of the freshness keeping agent was loaded in a permeable bag equivalent to that used in Example 1.

This experiment covered the following four cases:

Case (a)

One permeable bag of the freshness keeping agent and 1 kg of green asparagus were put in a corrugated cardboard box having the inner surface of the wall covered with a polyethylene film 25μ thick. Then, the edges of the polyethylene film were folded in a manner to cover the green asparagus and the bag of the freshness keeping agent, followed by closing the opening of the cardboard box with the lid thereof.

Case (b)

The same procedures as in case (a) were followed except that the polyethylene film was not used.

Case (c)

The same procedures as in case (a) were followed except that the freshness keeping agent was not put in the box.

Case (d)

Green asparagus alone was packed in a corrugated cardboard box without using either the freshness keeping agent or the polyethylene film.

Table 6 shows that the freshness keeping agent of this invention is very effective for preventing green asparagus from rottening. It is also seen that case (a) was superior to case (b), indicating that the higher sealing degree results in the greater effect produced by the freshness keeping agent of this invention.

EXAMPLE 5

A preservation test was applied to "Golden Delicious", a species of apple, by using samples 2, 3, 9 and 12 of the freshness keeping agent of this invention shown in Table 1 together with the conventional freshness keeping agent of activated carbon prepared from coconut shell. As in Example 1, 10 g of each freshness keeping agent was loaded in a premeable bag equivalent to that used in Example 1.

Specifically, about 10 kg the apple and 10 permeable bags housing the freshness keeping agent were put in a corrugated cardboard box, followed by sealing the lid of the box with an adhesive tape. The package thus prepared was transported by air plane from Aomori, Japan, the locality of the apple, to Tokyo, Japan, put under the atmosphere maintained at about 20° to 25° C. in order to examine the changes with the time in conditions of the apple including softening, color change and sugar content determined by saccharometer. Table 7 shows the results of the test.

TABLE 7

| Freshness keeping agent | Softening | | | Color change | | | sugar content | | |
|---|---|---|---|---|---|---|---|---|---|
| | 1 month later | 2 months later | 3 months later | 1 month later | 2 months later | 3 months later | 1 month later | 2 months later | 3 months later |
| Sample 2 | O | O | Δ ~ O | O | O | Δ ~ O | 16 | 15 | 15 |
| Sample 3 | O | O | O | O | O | O | 16 | 15 | 15 |
| Sample 9 | O | O | Δ ~ O | O | O | Δ ~ O | 15 | 14 | 14 |
| Sample 12 | O | O | Δ ~ O | O | O | Δ ~ O | 15 | 14 | 14 |
| Activated carbon | Δ | x | x | x | x | x | 13 | 12 | 10 |

Note:
O free from softening or color change
Δ slightly softened or slight color change occurred
x markedly softened or marked color change occurred Table 7 shows that the freshness keeping agent of this invention is prominently advantageous over the conventional freshness keeping agent of activated carbon. Particularly, sample 3 was prominently effective for preventing the apple from softening and color change.

EXAMPLE 6

A preservation test was applied to cherry by using samples 2 and 3 of the freshness keeping agent of this invention shown in Table 1. As in Example 1, 10 g of each sample of the freshness keeping agent was loaded in a permeable bag equivalent to that used in Example 1.

Specifically, 1 kg of cherry and one permeable bag housing the freshness keeping agent were put in a container (150 mm×250 mm×70 mm) made of a polyvinyl chloride sheet, followed by sealing the opening of the container with a stretch film, 10μ thick, of polyvinyl chloride. For comparison, cheery alone was packed in one of the containers without using the freshness keeping agent. The packages thus prepared were put under the atmosphere maintained at about 20° C. in an attempt to observe the progresses with time in softening and color change of the cherry, obtaining the results shown in Table 8.

TABLE 8

| Freshness keeping agent | Softening | | | | Color change | | | |
|---|---|---|---|---|---|---|---|---|
| | 7 days later | 14 days later | 21 days later | 28 days later | 7 days later | 14 days later | 21 days later | 28 days later |
| Sample 2 | O | O | O | O | O | O | O | O |
| Sample 3 | O | O | O | O | O | O | O | O |
| None | Δ | x | x | x | Δ | x | x | x |

Note:
O free from softening or color change
Δ slightly softened or slight color change occurred
x markedly softened or marked color change occurred Table 8 shows that the freshness keeping agent of this invention produces prominent effects of preventing cherry from softening and color change.

As described in detail, the freshness keeping agent of this invention, if housed in a container together with vegetables or fruits, serves to prevent the vegetables or fruits from softening, color change, rottenness, etc. over a long period of time. Further, the freshness keeping agent capable of generating carbon dioxide gas is effective for removing the astringency of the astringent fruit such as astringent persimmon. What should also be noted is that the freshness keeping agent of this invention is easy to handle and use.

What we claim is:

1. A closed storage container containing vegetables and fruits tending to be discolored by water evaporation and further containing a permeable bag containing a freshness keeping agent composition for vegetables and fruits which agent consists essentially of (i) from 30 to 100% of a mixture of adsorbents consisting essentially of from about 50 to 100% by weight of a mixture of main adsorbents selected from the group consisting of a bentonite-activated carbon mixture and a bentonite-zeolite mixture, each of the main adsorbents being present in an amount within the range of between 20 and 80% by weight of the total amount of said main adsorbents and from 0 to 50% by weight of at least one auxiliary adsorbent selected from the group of activated alumina and activated clay, (ii) from 0 to about 50% be weight of at least one oxygen-removing compound selected from the group consisting of sulfates and chlorides of manganese (II), iron (II), cobalt (II) and nickel (II), (iii) 0 to about 30% by weight of ascorbic acid or salts thereof, and (iv) 0 to about 30% by weight of at least one alkaline compound selected from the group consisting of hydroxides, carbonates and bicarbonates; said freshness keeping agent composition being present in an amount relative to the amount of vegetables and fruits sufficient to adsorb ethylene and the other gases generated by the vegetables and fruits during storage.

2. The closed container as defined in claim 1 wherein said freshness keeping agent composition consists of the main adsorbents.

3. The closed container as defined in claim 1 wherein said freshness keeping agent composition consists of the mixture of main adsorbents and auxiliary adsorbents.

4. The closed container as defined in claim 3 wherein the freshness keeping agent composition consists of from about 50 to about 80% by weight of the mixture of the main adsorbents and from about 20 to about 50% of the auxiliary adsorbent.

5. The closed container as defined in claim 1 wherein said alkaline compound is a hydroxide of an alkali metal or alkaline earth metal.

6. The closed container as defined in claim 1 wherein said freshness keeping agent composition consists essentially of from about 40 to 70% by weight of adsorbents, 10 to 45% by weight of the oxygen-removing compound and 5 to 25% by weight of the alkaline compound.

7. The closed container as defined in claim 1 wherein said freshness keeping agent composition consists essentially of from about 40 to 70% by weight of adsorbents, from about 5 to about 15% by weight of ascorbic acid or salts thereof and from about 5 to about 25% by weight of the alkaline compound.

8. The closed container as defined in claim 7 wherein said alkaline compound is selected from the group consisting of carbonates and bicarbonates of alkali metals and alkaline earth metals.

9. The closed container as defined in claim 1 wherein said freshness keeping agent composition consists essentially of from about 40 to 70% by weight of adsorbents, from about 20 to about 50% by weight of a mixture of the oxygen-removing compound and ascorbic acid or salts thereof and from about 5 to about 25% by weight of the alkaline compound.

10. The closed container as defined in claim 9 wherein said mixture of the oxygen-removing compound and ascorbic acid or salts thereof consists essentially of 1 to 2 parts by weight of the oxygen-removing compound and 1 part by weight of ascorbic acid or salts thereof.

11. A method of preserving freshness of harvested vegetables and fruits which comprises maintaining said vegetables or fruits in the closed container containing the freshness keeping agent of claim 1.

* * * * *